United States Patent
Ku (10) Patent No.: US 9,892,850 B2
(45) Date of Patent: Feb. 13, 2018

(54) ELECTRONIC DEVICE AND METHOD OF EXTENDING READING DISTANCE

(71) Applicant: SINO MATRIX TECHNOLOGY, INC., Hsinchu (TW)

(72) Inventor: Mu-Feng Ku, Hsinchu (TW)

(73) Assignee: SINO MATRIX TECHNOLOGY, INC., Hsinchu (TW)

( * ) Notice: Subject to any disclaimer, the term of this patent is extended or adjusted under 35 U.S.C. 154(b) by 0 days.

(21) Appl. No.: 15/210,907

(22) Filed: Jul. 15, 2016

(65) Prior Publication Data

US 2017/0017813 A1  Jan. 19, 2017

Related U.S. Application Data

(60) Provisional application No. 62/193,093, filed on Jul. 16, 2015.

(30) Foreign Application Priority Data

Nov. 2, 2015 (TW) ................................. 104136042
Apr. 21, 2016 (JP) ................................. 2016-085508

(51) Int. Cl.
*H04Q 5/00* (2006.01)
*H01F 38/14* (2006.01)
*G06K 7/10* (2006.01)

(52) U.S. Cl.
CPC ......... *H01F 38/14* (2013.01); *G06K 7/10188* (2013.01)

(58) Field of Classification Search
CPC  G06K 7/10; G06K 7/10009; H01F 2038/143; H01F 2030/146; H01F 38/14
USPC ............ 340/10.1, 12.51, 13.26, 572.1–572.9
See application file for complete search history.

(56) References Cited

U.S. PATENT DOCUMENTS

| | | | |
|---|---|---|---|
| 8,960,546 B2 | 2/2015 | Streater | |
| 2006/0208899 A1* | 9/2006 | Suzuki | G06K 19/07749 340/572.7 |
| 2007/0222603 A1* | 9/2007 | Lai | G06K 7/10178 340/572.7 |
| 2008/0238625 A1* | 10/2008 | Rofougaran | H04B 5/0012 340/10.1 |
| 2010/0045114 A1* | 2/2010 | Sample | H02J 5/005 307/104 |
| 2013/0049481 A1* | 2/2013 | Kudo | G06K 7/0008 307/104 |

FOREIGN PATENT DOCUMENTS

CN   101179158 A   5/2008

\* cited by examiner

*Primary Examiner* — Carlos E Garcia
(74) *Attorney, Agent, or Firm* — CKC & Partners Co., Ltd.

(57) ABSTRACT

An electronic device includes a reader and a plurality of first coil units. The reader is configured to read at least one wireless signal. The reader is connected to a first coil unit of the first coil units to read the wireless signal in an original reading distance. Other first coil unit(s) of the first coil units is separately arranged in an order started from the first coil unit. Spacing between any two of the first coil units is lower than or equal to the original reading distance. The first coil units are configured to generate magnetic coupling with an adjacent first coil unit started from the first coil unit to extend the original reading distance as a first extended reading distance and adjust a direction of the first extended reading distance.

11 Claims, 13 Drawing Sheets

ELECTRONIC DEVICE AND METHOD OF EXTENDING READING DISTANCE

RELATED APPLICATIONS

This application claims priority to U.S. Provisional Application Ser. No. 62/193,093, filed Jul. 16, 2015, Taiwan Application Serial Number 104136042, filed Nov. 2, 2015, and Japanese Application Serial Number 2016-085508, filed Apr. 21, 2016, which are herein incorporated by reference.

BACKGROUND

Technical Field

The present invention relates to a wireless communication technology. More particularly, the present invention relates to a device for adjusting orientation of magnetic field and a device for extending and expanding operational range of a radio frequency tag.

Description of Related Art

In present radio frequency (RF) technology for wireless reading, a readable range of a RF tag by a RF reader with a single antenna is a circular magnetic field or an elliptical magnetic field around the antenna. If a read position of the RF tag is changed, the position of the antenna of the RF reader has to be changed accordingly. Moreover, in a situation where the RF reader reads a RF tag with a three-dimensional shape, when the RF tag with a three-dimensional shape passes through the space in the antenna of the RF reader, passing time in the readable range of the antenna may be too short to successfully read the RF tag. Or, if the RF tag passes through the antenna of the RF reader along a direction of a reading dead space, the RF tag will not be able to acquire enough energy for operation. Because the direction of the RF tag is unchangeable at the moment, the RF reader loses data of the RF tag.

SUMMARY

In order to extend time for a RF tag to pass through an antenna of a radio frequency (RF) reader and be able to change orientation of a magnetic field, an aspect of the present disclosure provides an electronic device, which includes a reader and a plurality of first coil units. The reader is configured to read at least one wireless signal. The reader is connected to a first coil unit of the first coil unit to read the at least one wireless signal in an original reading distance. Other first coil units of the first coil units are separately arranged in an order started from the first coil unit. Spacing between two of the first coil units is smaller than or equal to the original reading distance. The first coil units are configured to generate magnetic coupling with an adjacent first coil unit started from the first coil unit to extend the original reading distance to a first extended reading distance and to adjust a direction of the first extended reading distance.

In one embodiment of the present disclosure, the first coil units have same sizes and are arranged along a straight line. The spacing is equal to the original reading distance. A number of the first coil units is a positive integer N. The first extended reading distance is N times the original reading distance. The direction of the first extended reading distance is along the straight line.

In one embodiment of the present disclosure, the first coil units have same sizes and are arranged along a curve, and the direction of the first extended reading distance is along the curve.

In one embodiment of the present disclosure, the first coil units are arranged according to sizes of the first coil units, and the first coil unit is a minimum first coil unit in the first coil units.

In one embodiment of the present disclosure, the first coil units are arranged according to sizes of the first coil units, and the first coil unit is a maximum first coil unit in the first coil units.

In one embodiment of the present disclosure, each of the other first coil unit includes a resonant capacitor.

In one embodiment of the present disclosure, the electronic device further includes a flexible supporting unit with a hollow channel. The at least one wireless signal is from at least one data-generating module. The first coil units are disposed along a surface of the flexible supporting unit to adjust the direction of the first extended reading distance to be along the hollow channel. When the at least one data-generating module is in the hollow channel, the reader continuously read the at least one wireless signal.

In one embodiment of the present disclosure, the at least one data-generating module is at least one radio frequency (RF) tag, the reader is a radio frequency reader, the at least one wireless signal is at least one radio frequency signal, and the flexible supporting unit is a non-metal structure.

In one embodiment of the present disclosure, the electronic device further includes a plurality of second coil units. The reader is connected to a second coil unit of the second coil units to read the at least one wireless signal in the original reading distance. Other second coil units of the second coil units are separately arranged in an order started from the second coil unit. Spacing between two of the second coil units is smaller than or equal to the original reading distance. The second coil units are configured to generate magnetic coupling with an adjacent second coil unit started from the second coil unit to extend the original reading distance to a second extended reading distance and to adjust a direction of the second extended reading distance.

Another aspect of the present disclosure provides a method of extending reading distance that includes steps as follows. Magnetic coupling is generated in turn by a plurality of first coil units that are separately arranged. A reader is connected to a first coil unit of the first coil units to read at least one wireless signal in an original reading distance. Other first coil units of the first coil units are separately arranged in an order started from the first coil unit. The original reading distance is extended to a first extended reading distance. A direction of the first extended reading distance is adjusted.

In one embodiment of the present disclosure, the direction of the first extended reading distance is adjusted to be along a hollow channel of the flexible supporting unit by a flexible supporting unit. The first coil units are disposed along a surface of the flexible supporting unit. The at least one wireless signal is from at least one data-generating module. The at least one wireless signal is continuously read by the reader when the at least one data-generating module is in the hollow channel.

In one embodiment of the present disclosure, magnetic coupling is generated in turn by a plurality of second coil units that are separately arranged. The reader is connected to a second coil unit of the second coil units to read the at least one wireless signal in the original reading distance. Other second coil units of the second coil units are separately arranged in an order started from the second coil unit. The original reading distance is extended to a second extended reading distance. A direction of the second extended reading distance is adjusted.

In conclusion, the present disclosure uses one or more coil units and separately arranged coil units that are connected to a reader to extend a reading distance and adjust a direction of the reading distance through magnetic coupling. As a result, time for a data-generating module to pass through a reading distance can be extended, and possibility of reading is improved because dead spaces of reading are reduced.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure. Moreover, the description of steps is not used to limit the execution sequence thereof. Any device with an equivalent effect through rearrangement is also covered by the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise indicated, all numbers expressing quantities, conditions, and the like in the instant disclosure and claims are to be understood as modified in all instances by the term "about." The term "about" refers, for example, to numerical values covering a range of plus or minus 20% of the numerical value. The term "about" preferably refers to numerical values covering range of plus or minus 10% (or most preferably, 5%) of the numerical value. The modifier "about" used in combination with a quantity is inclusive of the stated value.

In this document, the term "coupled" may also be termed as "electrically coupled," and the term "connected" may be termed as "electrically connected," "Coupled" and "connected" may also be used to indicate that two or more elements cooperate or interact with each other.

Figure 1:
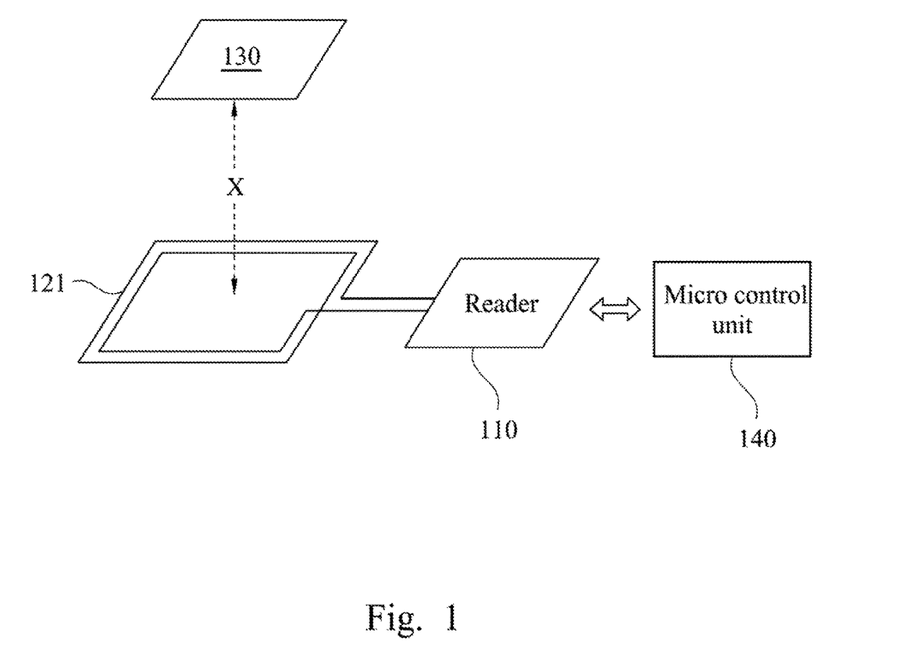
FIG. 1 is a schematic diagram of an electronic device.

In order to describe a reading distance, reference is made to FIG. 1. A reader 110 is connected to a coil unit 121 to detect wireless signal in an original reading distance X. The wireless signal is from a data-generating module 130 in the original reading distance X. Specifically, a micro control unit 140 (e.g., a microcontroller) controls the reader 110 to generate magnetic field through the connected coil unit 121, and a farthest distance covered by the magnetic field is the original reading distance X. The data-generating module 130 in the original reading distance X converts magnetic energy into electrical energy through the magnetic field. When the electrical energy reaches an operational electrical power, the data-generating module 130 wirelessly sends data (i.e., wireless signal) to the reader 110, therefore the reader 110 can read the data sent by the data-generating module 130. In other words, the reading distance can also represent the operational range of the data-generating module 130.

The aforementioned original reading distance X is dependent on designs of the reader 110, the coil unit 121 and the data-generating module 130. The original reading distance X is about a range from some centimeters (cm) to some tens of centimeters (cm).

Figure 2:
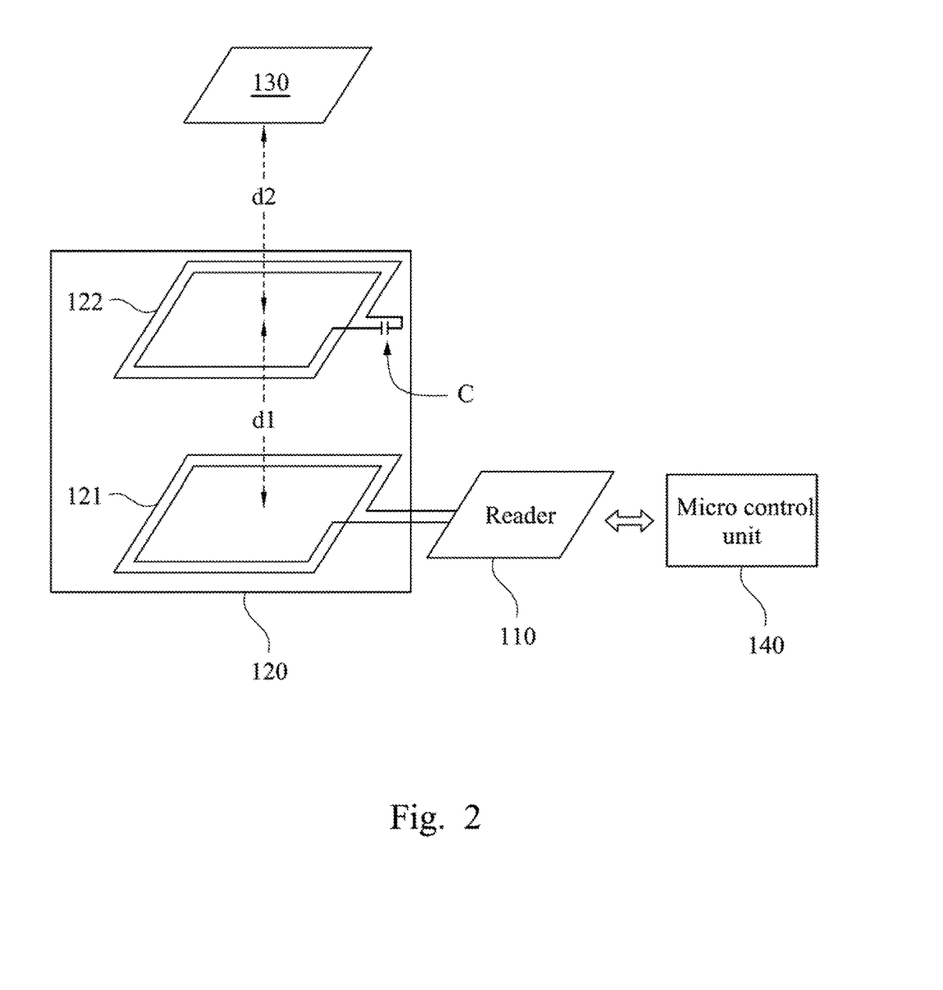
FIG. 2 is a schematic diagram of an electronic device according to an embodiment of the present disclosure.

FIG. 2 is a schematic diagram of an electronic device according to an embodiment of the present disclosure. The electronic device includes a reader 110 and a plurality of coil units 120 (including coil units 121 and 122). The reader 110 is connected to the coil unit 121. The reader 110 is configured to read wireless signal (e.g., wireless signal from a data-generating module 130). The coil unit 122 and the coil unit 121 are arranged along a straight line, a spacing between the coil units 121 and 122 is d1. The spacing d1 is smaller than or equal to the original reading distance X. In other words, the coil unit 122 is in the readable distance X and configured to generate magnetic coupling with the coil unit 121 connected to the reader 110 to extend the original reading distance X to an extended reading distance. In the present embodiment, the data-generating module 130 can be disposed on a position that is at a distance of a spacing d2 from the coil unit 122. The extended reading distance is the spacing d1 plus the spacing d2, and therefore the reader 110 can read wireless signal sent by the generating module 130 in the extended reading distance (d1+d2). In other words, the operational range of the data-generating module 130 is extended to (d1+d2). The original reading distance and the extended reading distance both indicate distances from the coil unit 121.

Specifically, the aforementioned coil unit 122 resonates with the coil unit 121 to extend a magnetic field range generated by the reader through the coil unit 121. In practice, the coil unit 122 may include a capacitor C, and the capacitor C with an appropriate capacitance is selected according to the design of the coil unit to determine a resonant frequency that is same as a resonant frequency f of the coil unit 121. For example, L is an equivalent inductance of the coil unit 122, C is capacitance of the capacitor (e.g., resonant capacitor), and the resonant frequency f of the coil unit 122 can be calculated by an equation as follows.

$$f=1/2\pi\sqrt{LC}$$

In another embodiment, the coil units 121 and 122 have a same size, and the spacing d1 is equal to the original reading distance X. As a result, the reader 110 can read wireless signal in two times the original reading distance X, that is, the extended reading distance (operational range of the data-generating module 130) is 2×. For example, if the original reading distance X is 6 centimeters, then the extended reading distance can reach 12 centimeters.

Figure 3:
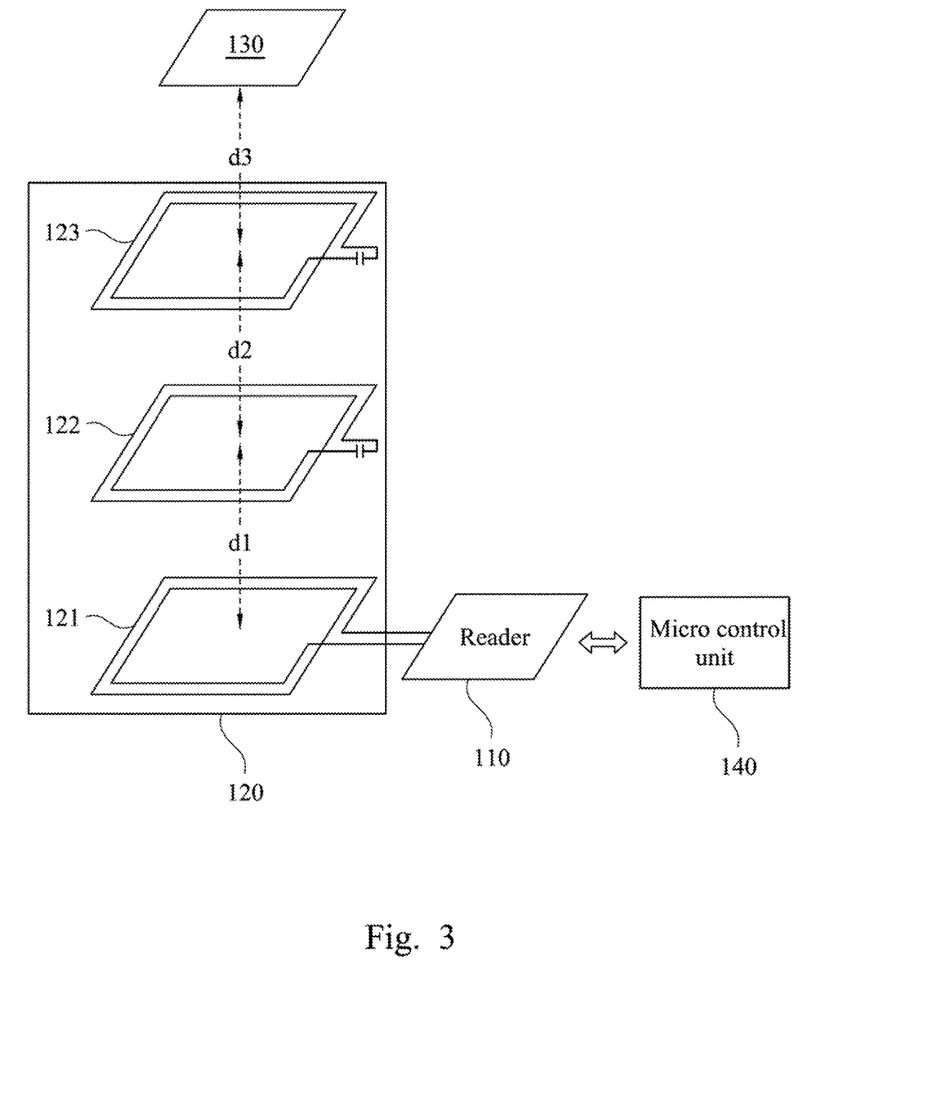
FIG. 3 is a schematic diagram of an electronic device according to an embodiment of the present disclosure.

In one embodiment with an increased number of the coil unit 120, as shown in FIG. 3, an electronic device in the FIG. 3 has substantially the same hardware as the electronic device in FIG. 2 except that a coil unit 123 is added between the coil unit 122 and the data-generating module 130. The coil units 121, 122 and 123 are arranged along a straight line, and a spacing d2 between the coil units 122 and 123 is smaller than or equal to the original reading distance X. The data-generating module 130 can be disposed on a position that is at a distance of spacing d3 from the coil unit 123. In operation, the reader 110 generates magnetic field through the connected coil unit 121. The coil unit 122 generates magnetic coupling with the coil unit 121 that is connected to the reader 110, and the coil unit 123 generates magnetic coupling with the coil unit 122. Therefore, the extended reading distance can be extended to a sum of the spacing d1, d2 and d3, i.e., (d1+d2+d3). Implementation of the coil unit 123 is similar to the implementation of the coil unit 122, and would not be repeated herein. As aforementioned, when the data-generating module 130 in the extended reading distance (d1+d2+d3) converts magnetic energy into operational electrical energy through the magnetic field and send the wireless signal to the reader 110, the reader 110 then reads the wireless signal.

In another embodiment, the coil units 121, 122 and 123 have a same size, and the spacing d1 and d2 are both equal to the original reading distance X. As a result, the reader 110 can read wireless signal in three times the original reading distance X, i.e., the extended reading distance is 3×. For example, if the original reading distance X is 6 centimeters, then the extended reading distance can reach 18 centimeters.

As aforementioned, the present disclosure generates magnetic coupling in an arrangement order of coil units to effectively extended reading distance of the reader 110 by adding number of the coil units (e.g., the coil units 122, 123, . . . ) between the coil unit 121 connected to the reader 110 and the data-generating module 130. The aforementioned number of the coupled coil units (e.g., the coil unit 122, 123, . . . ) is determined according to transmitted power of the reader 110 and attenuation during coupling. For example, in a situation of effective magnetic coupling, the number of the coil units 120 arranged along a straight line is a positive integer N and the coil units have a same size, then the extended reading distance is N times the original reading distance X, that is, the extended reading distance is (N*X).

Figure 4:
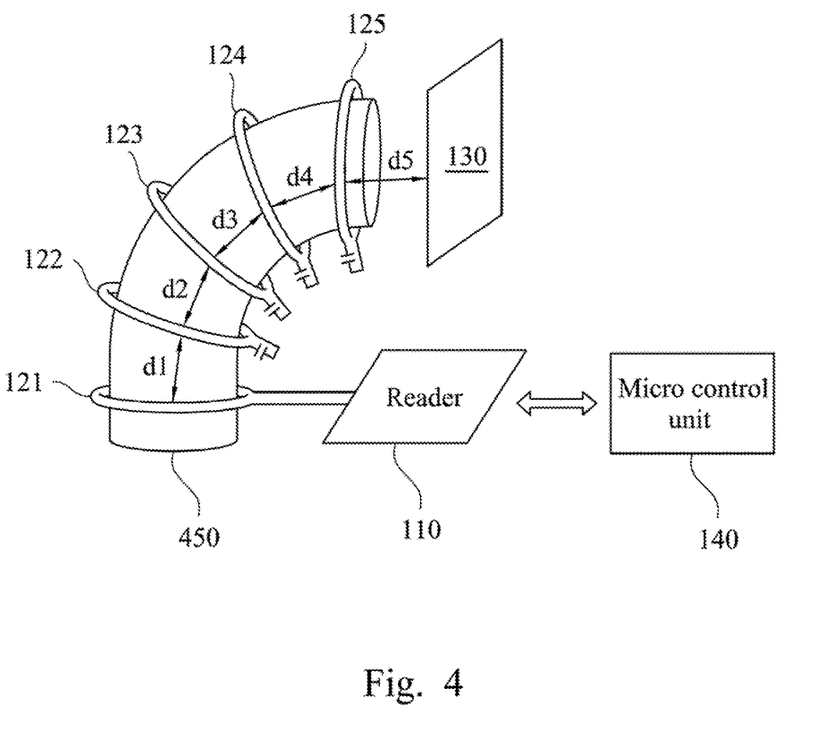
FIG. 4 is a schematic diagram of an electronic device according to an embodiment of the present disclosure.

FIG. 4 is a schematic diagram of an electronic device according to an embodiment of the present disclosure. The electronic device includes a reader 110, coil units 121-125 and a flexible supporting unit 450. The flexible supporting unit 450 has a hollow channel. The coil units 121-125 are arranged along a surface of the flexible supporting unit 450 to adjust a direction of the extended reading distance to be along the hollow channel, that is, the coil units 121-125 are arranged along a bending direction of the flexible supporting unit 450 so that the coil units can be arranged along a direction of a straight line, a curve or another direction. As shown in FIG. 4, when the coil units 121-125 are separately arranged along a curve, spacing d1-d4 of adjacent two coil units satisfy that spacing in at least one direction is smaller than or equal to the original reading distance X, then the coil units 121-125 can generate magnetic coupling in turn. As a result, the extended reading distance covers interior of the hollow channel and a distance of spacing d5 from the coil unit 125 outside the hollow channel. The spacing d5 is smaller than or equal to the original reading distance X. Therefore, when the data-generating module 130 is located on any position in the hollow channel of the flexible supporting unit 450, possibility of reaching the operational electrical energy to send the wireless signal to the reader 110 by the data-generating module 130 is improved because reading dead spaces are reduced.

Figure 5:
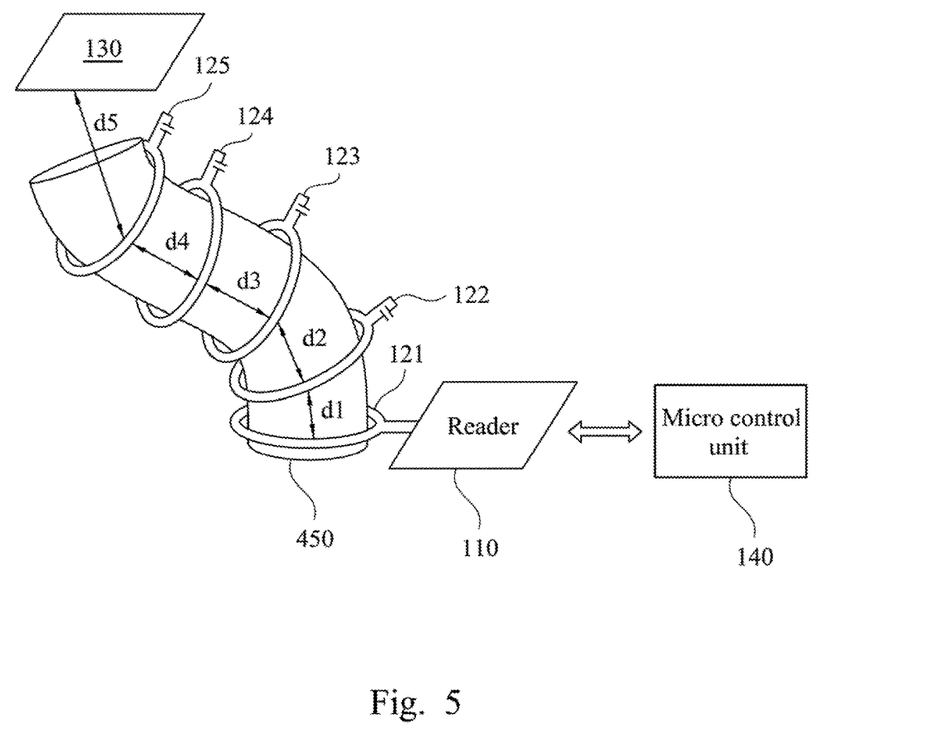
FIG. 5 is a schematic diagram of an electronic device according to an embodiment of the present disclosure.

The coil units 121-125 in FIGS. 4 and 5 are arranged along different curves, that s bending statuses of the flexible supporting unit 450 are different. As aforementioned, spacing d1-d4 of adjacent two coil units of the coil units 121-125 in FIG. 5 satisfy that spacing in at least one direction is smaller than or equal to the original reading distance X, then the coil units 121-125 can generate magnetic coupling in turn. As a result, the extended reading distance covers interior of the hollow channel and a distance of spacing d5 from the coil unit 125 outside the hollow channel. The spacing d5 is smaller than or equal to the original reading distance X. Therefore, the direction of the extended reading distance can be adjusted through arrangement of the coil units 121-125. In one embodiment, because the coil units 121-125 are disposed on the surface of the flexible supporting unit 450, then the direction of the reading distance can also be adjusted by adjusting the direction of the flexible supporting unit 450. In another embodiment, the coil units are integrated with the flexible supporting unit 450.

Implementation of the coil units 122-125 in FIGS. 4 and 5 is similar to implementation of the coil unit 122 in FIG. 2, and would not be repeated herein.

In an application situation, a user can put the data-generating module 130 in the hollow channel of the flexible supporting unit 450, and wireless signal sent by the data-generating module 130 that enters the hollow channel can be continuously read by the reader 110. In another application situation, a bending manner of the flexible supporting unit 450 can also be adjusted to adapt to different use situation (e.g., the user puts the data-generating module 130 in the hollow channel along different directions).

Figure 6:
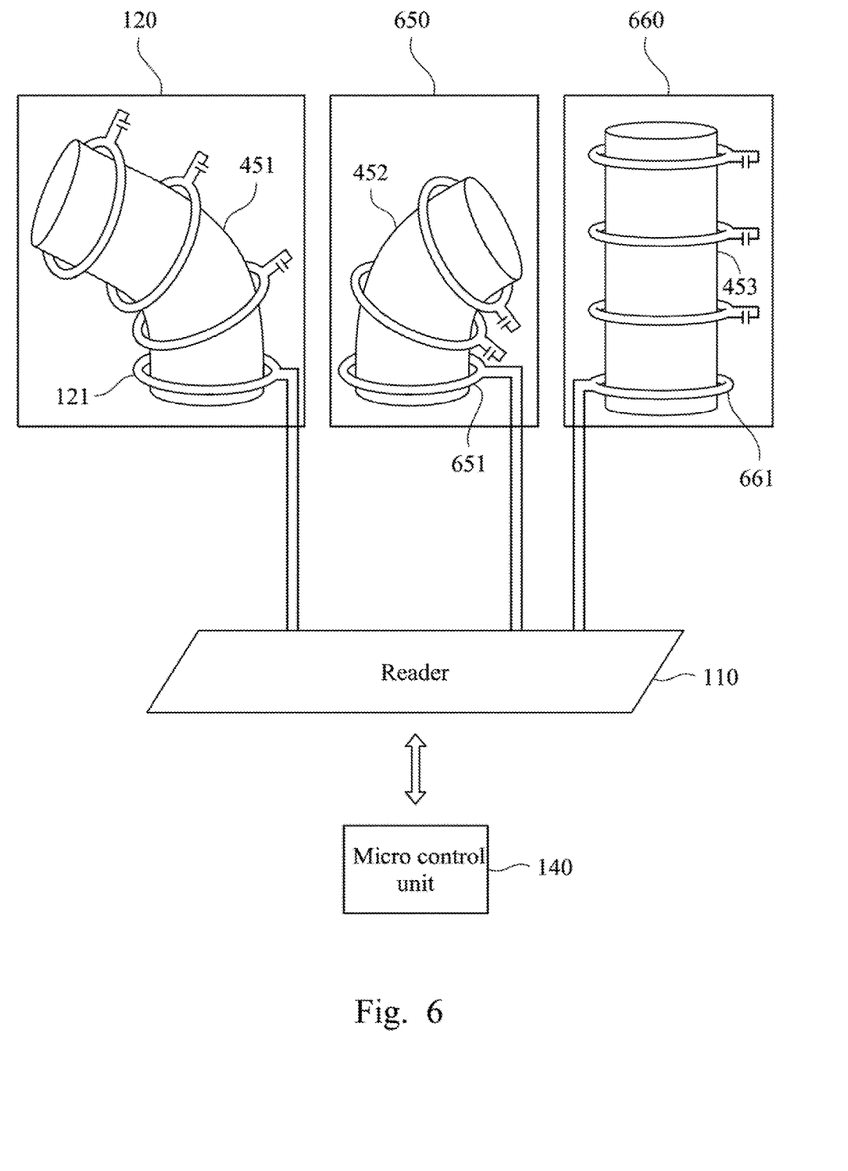
FIG. 6 is a schematic diagram of an electronic device according to an embodiment of the present disclosure.

In one embodiment, as shown in FIG. 6, the reader 110 can be connected to many sets of a plurality of coil units 120, 650 and 660. The reader 110 can support application of multiple antennas and can be connected to the coil units 121, 651 and 661. The sets of the plurality of coil units 120, 650 and 660 are respectively disposed on surfaces of flexible supporting units 451, 452 and 453. Numbers of the sets of the plurality of coil units 120, 650 and 660 can be the same or different. Lengths and bending statuses of the flexible supporting units 451, 452 and 453 can be the same or different. As aforementioned, the sets of the plurality of coil units 120, 650 and 660 generate magnetic coupling in an order respectively started from coil units 121, 651 and 661 to generate different types of extended reading distances. Therefore, the electronic device shown in FIG. 6 can achieve a combination of extended reading distances with multiple positions and multiple directions to adapt to different application situations.

Figure 7:
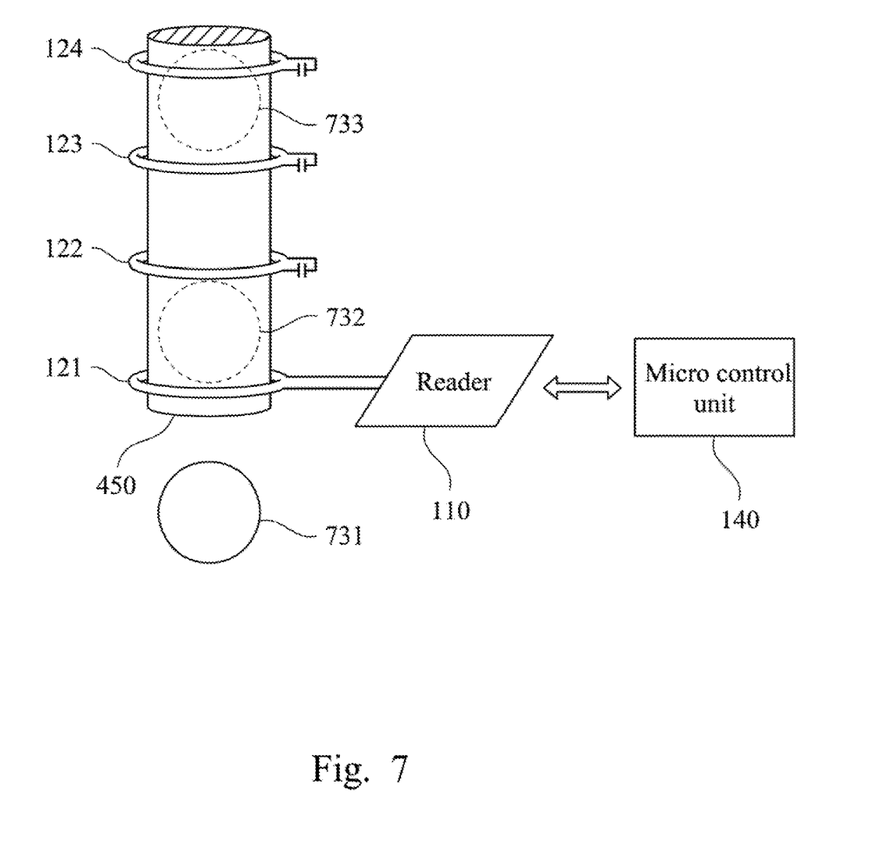
FIG. 7 is a schematic diagram of an electronic device according to an embodiment of the present disclosure.

In one embodiment, the electronic device of the present disclosure can read wireless signals of many data-generating modules 731-733 through a set of coil units 120, as shown in FIG. 7. The coil units 121-124 are disposed on the surface of the flexible supporting unit 450 and arranged along a straight line. A coil unit 121 is connected to the reader 110, as aforementioned, the extended reading distance covers interior of the hollow channel of the flexible supporting unit 450. Time for the data-generating modules 731-733 to vertically pass through the hollow channel is enough to reach the operational electrical energy to send the wireless signals to the reader 110 and therefore the wireless signals are read by the reader 110.

Figure 8:
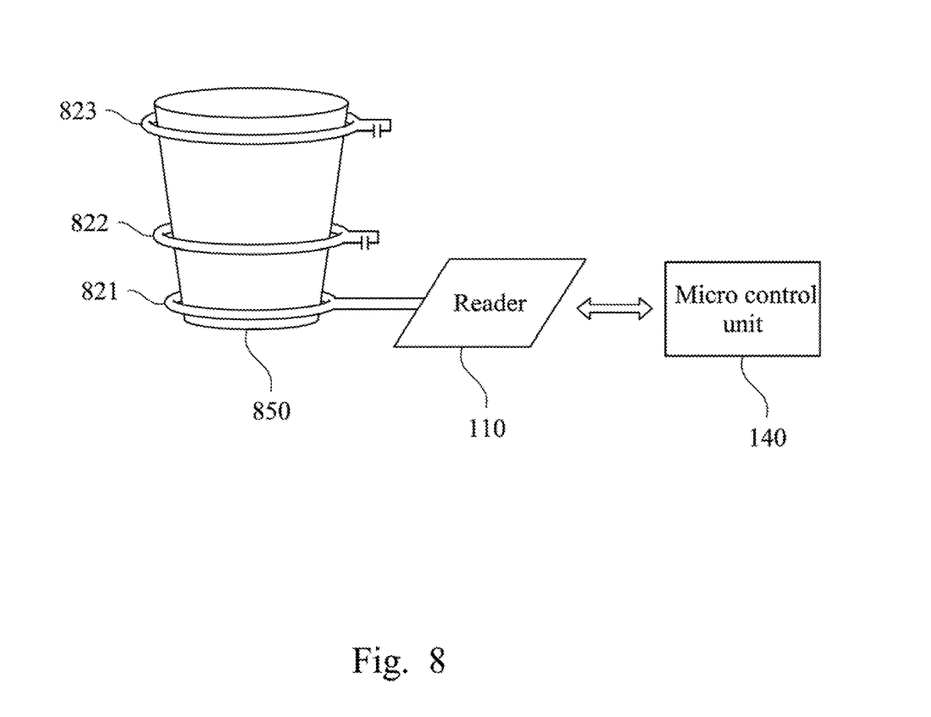
FIG. 8 is a schematic diagram of an electronic device according to an embodiment of the present disclosure.

In one embodiment, many coil units can have different sizes. As shown in FIG. 8, the coil units 821-823 are separately disposed in an order of increasing size on a surface of the flexible supporting unit 850 with a cone shape, in which the minimum coil unit 821 is connected to the reader 110. Spacing of the coil units 821-823 are adjusted according to strengths of magnetic fields coupled by the coil units 822 and 823. For example, spacing of the coil units 821-823 are decreased according to decreased sizes of the coil units. In other words, the spacing of the coil units 823 and 822 is larger than the spacing of the coil units 822 and 821. As a result, the present disclosure can extend magnetic field, change a direction of the magnetic field and extend area of the magnetic field; and therefore achieve different types of extended reading distance, i.e., different types of operational ranges of the data-generating module 130.

Figure 9:
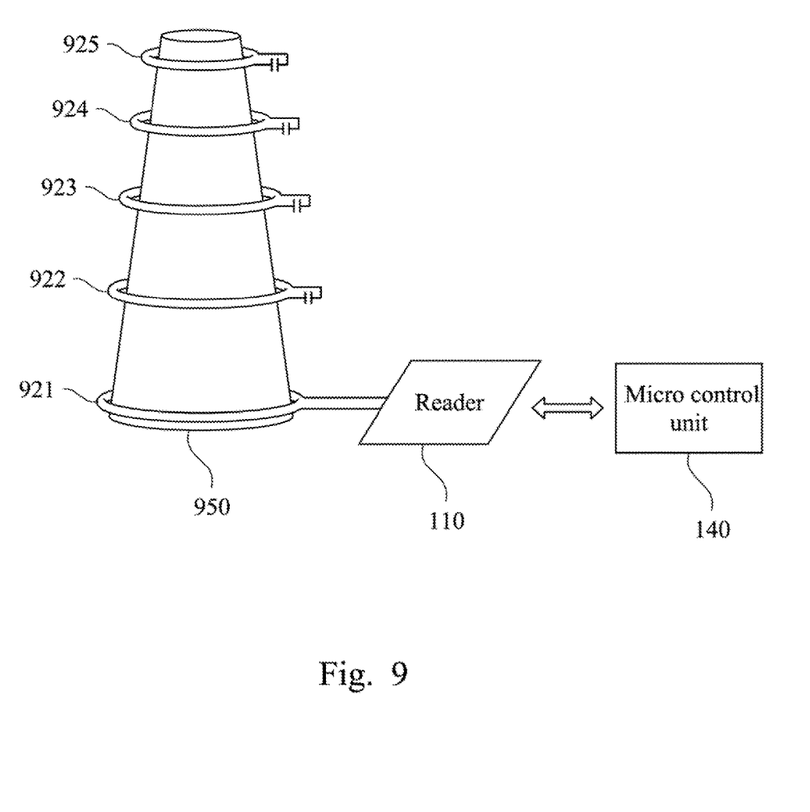
FIG. 9 is a schematic diagram of an electronic device according to an embodiment of the present disclosure.

In another embodiment, as shown in FIG. 9, coil units 921-925 are separately disposed in an order of decreasing size on a surface of the flexible supporting unit 950 with a cone shape, in which the maximum coil unit 921 is connected to the reader 110. Spacing of the coil units 921-925 are adjusted according to strengths of magnetic fields coupled by the coil units 922-925. For example, spacing of the coil units 921-925 are decreased according to decreased sizes of the coil units. In other words, the spacing of the coil units 921 and 922 is the largest, and the spacing of the coil units 924 and 925 is the smallest. As a result, the present disclosure can extend magnetic field, change a orientation of the magnetic field and density of the magnetic field, and reduce area of the magnetic field to make the magnetic field be directional, and therefore achieve different types of extended reading distances, i.e., different types of operational ranges of the data-generating module 130.

Figure 11:
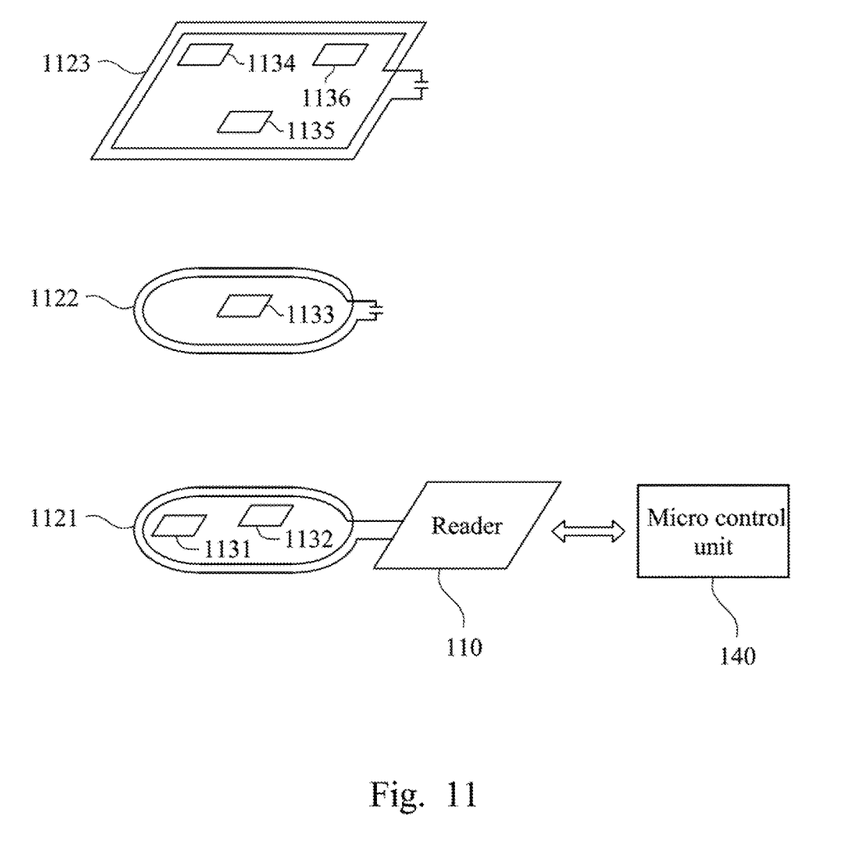
FIG. 11 is a schematic diagram of an electronic device according to an embodiment of the present disclosure.

In one embodiment, the electronic device of the present disclosure may read wireless signals of plural data-generating modules 1131-1136 through a set of coil units 1121-1123, as shown in FIG. 11. The coil units are arranged along a straight line. The coil unit 1121 is connected to the reader 110, and projecting areas of the coil units 1121-1123 are partially overlapped. As aforementioned, an extended reading distance covers a space between the coil units 1121-1123. The data-generating modules 1131 and 1132 are located on a plane same as a plane on which the coil unit 1121 is located, the data-generating module 1133 is located on a plane same as a plane on which the coil unit 1122 is located and the data-generating modules 1134-1136 are located on a plane on which the coil units 1123 is located. The data-generating modules 1131-1136 can reach an operational electrical energy to respectively send wireless signals to the reader 110, and the wireless signals can be read by the reader 110. Therefore, there may be one or more data-generating modules 1131-1136 on planes same as the planes on which the coil units 1121-1123 are located at the same time. Alternatively, there may be one or more data-generating modules 1131-1136 an planes different from the planes on which the coil units 1121-1123 are located at the same time. It should be noted that, the data-generating modules 1131-1136 may be located on fixed or non-fixed positions inside the coil units 1121-1123. In the above situations, the reader 110 can read the wireless signals generated by the data-generating modules 1131-1136.

Shapes of the aforementioned coil units are not limited to be rectangular shapes (e.g., a square shape with length and width that are both 6 centimeters) and circular shapes, but also include any other shapes. Shapes of the data-generating modules 130, and 731-733 are not limited to rectangular shapes, circular shapes and spherical shapes, but also include other two-dimensional or three-dimensional shapes. Because metal may affect distribution of magnetic field, in one embodiment, the flexible supporting units 450 and 451-453 may be structures (e.g., tubular shapes) of plastic, rubber, silicone or a combination thereof, in which metal is not included.

Figure 12:
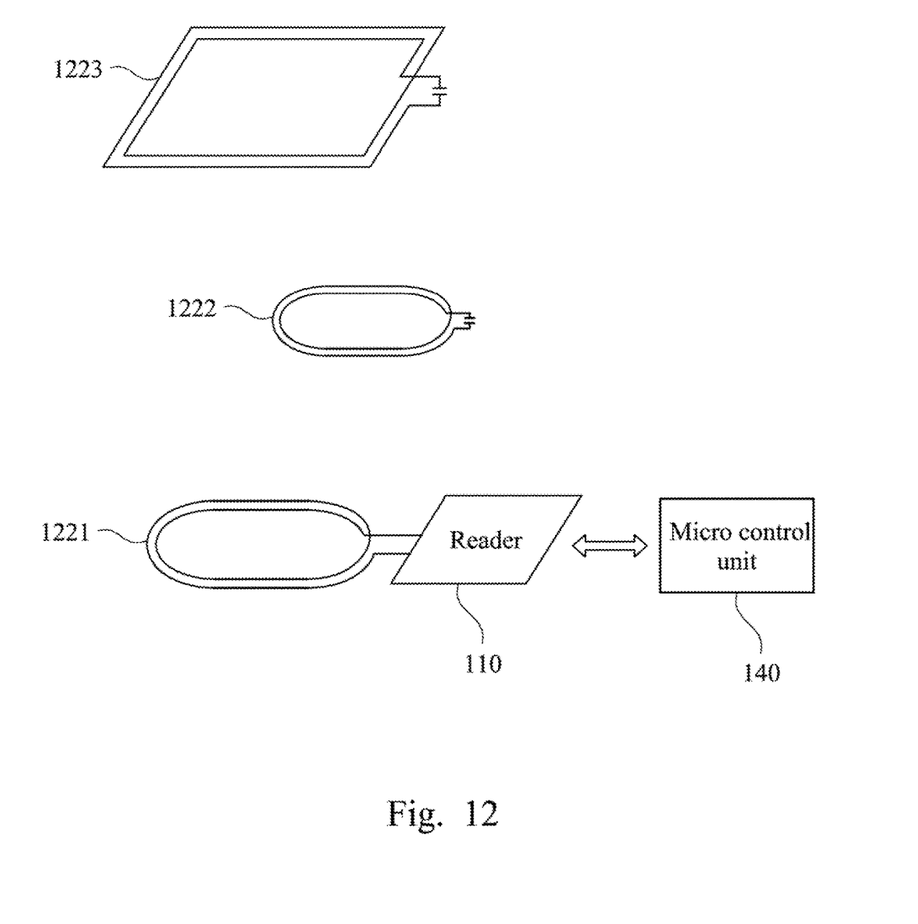
FIG. 12 is a schematic diagram of an electronic device according to an embodiment of the present disclosure.

In one embodiment, the coil units 1221-1223 may have same or different sizes and shapes. As shown in FIG. 12, the coil units 1221 and 1222 that are connected to the reader 110 have circular shapes, and the coil unit 1223 has a rectangular shape. The coil units 1221-1223 have different sizes, and projecting areas of the coil units 1221-1223 are partially overlapped. As aforementioned, the coil units 1222-1223 and the coil unit 1221 can generate magnetic coupling to extend the original reading distance to an extended reading distance.

Figure 13:
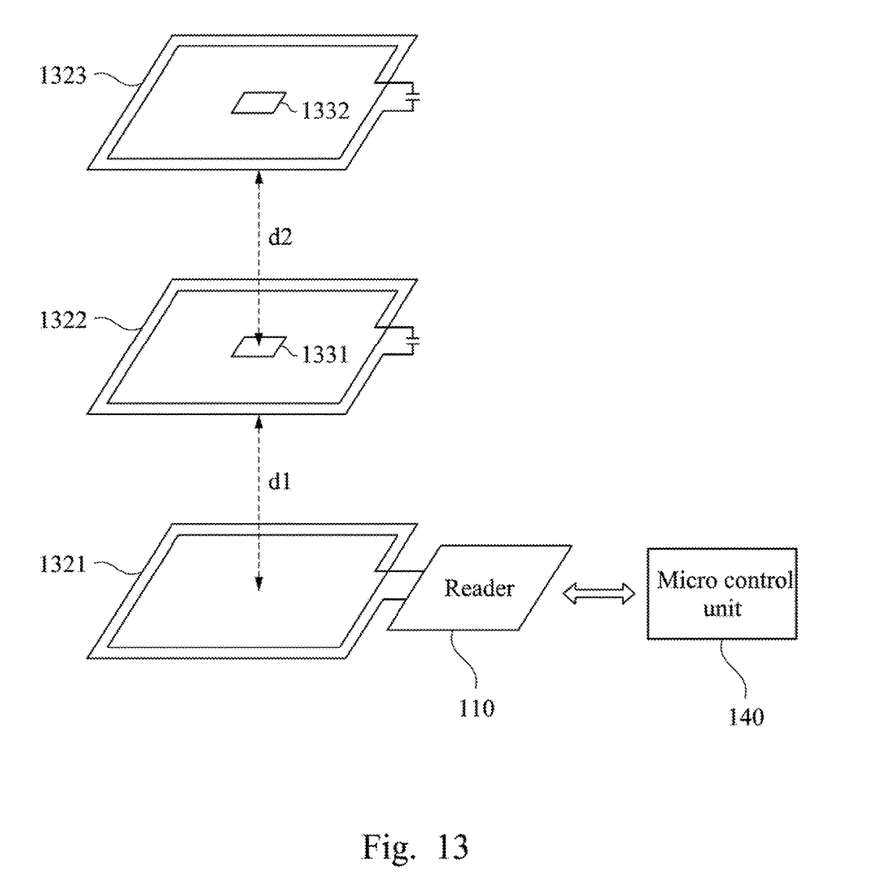
FIG. 13 is a schematic diagram of an electronic device according to an embodiment of the present disclosure.

In one embodiment, as shown in FIG. 13, spacing between a coil unit 1321 connected to the reader 110 and a coil unit 1322 is d1, spacing between the coil unit 1322 and a coil unit 1323 is d2, and spacing d1 and d2 are lower than or equal to the original reading distance X. It should be noted that, the data-generating module 1331 is manufactured on a plane same as a plane on which the coil units 1322 is located, and the data-generating module 1332 is manufactured on a plane on which the coil units 1323 is located. In one embodiment, the data-generating modules 1331 and 1332 may be manufactured on planes different form planes on which the coil units 1321-1323 are located.

In practice, the coil units 121, 651 and 661 that are connected to the reader 110 may be reading antennas of the reader 110. The other coil units may be resonant antennas, and resonant frequencies are equal to working frequencies (including but not limited to 120 kHz-150 kHz, 13.56 MHz) of the reader 110 through the reading antennas. The reader 110 may be a RF reader and can be implemented as an integrated circuit (IC) or a chip. The data-generating module 130 may be a RF tag that sends a RF signal when reaching an operational electrical energy.

Figure 10:
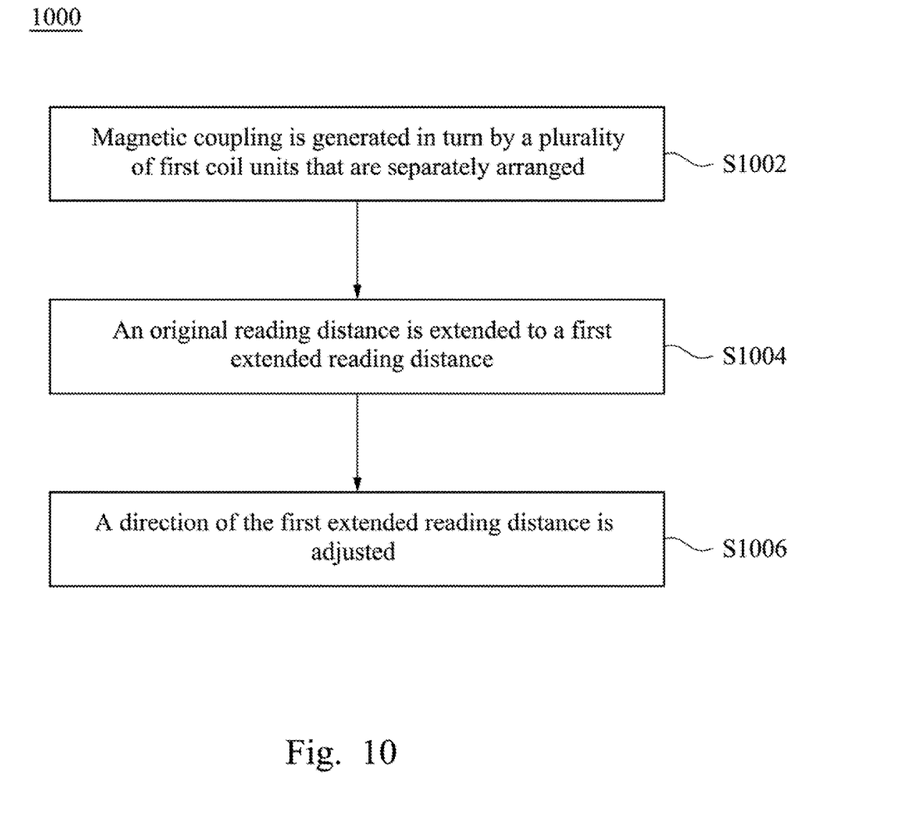
FIG. 10 is a flow chart of a method of extending reading distance according to an embodiment of the present disclosure.

FIG. 10 is a flow chart of a method 1000 of extending reading distance according to an embodiment of the present disclosure. The method 1000 includes a plurality of steps S1002-S1006 and can be implemented by the electronic devices as shown in FIGS. 2-9 and FIGS. 11-13. However, those skilled in the art should understand that, unless a particular sequence is specified, the sequence of the steps in the present embodiment can be adjusted according to actual needs. Moreover, all or some of the steps can even be executed simultaneously. Operation and implementation of the reader and the coil units are disclosed as above, and would not be repeated herein.

For convenience in description, reference is made to FIGS. 2 and 10. In step S1002, magnetic coupling is generated in turn by a plurality coil units 120 of that are separately arranged. A reader 110 is connected to a coil unit 121 of the coil units 120 to read wireless signal in an original reading distance X. The other coil unit 122 of the coil units 120 is separately arranged in an order started from the coil unit 121.

In step S1004, the original reading distance X is extended to an extended reading distance (d1+d2).

In step S1006, a direction of the extended reading distance is adjusted to be a straight line (e.g., as shown in FIGS. 2 and 3) or a curve (e.g., as shown in FIGS. 4 and 5).

Through the aforementioned embodiments, the present disclosure can use one or more coil units and separately arranged coil units that are connected to a reader to extend a reading distance and adjust a direction of the reading distance through magnetic coupling. As a result, time for a data-generating module to pass through a reading distance can be extended, and possibility of reading is improved because dead spaces of reading are reduced.

Even though the present disclosure is disclosed as above, the disclosure is not used to limit the present disclosure. It will be apparent to those skilled in the art that various modifications and variations can be made to the present disclosure without departing from the spirit or scope of the invention; thus, it is intended that the range protected by the present disclosure should refer to the scope of the following claims.

What is claimed is:

1. An electronic device, comprising:
a reader configured to read at least one wireless signal;
a plurality of first coil units; and
a flexible supporting unit, wherein the first coil units are arranged along a surface of the flexible supporting unit,
wherein the reader is connected to a first coil unit of the first coil units to read the at least one wireless signal in an original reading distance, and other first coil units of the first coil units are disconnected from each other in an order started from the first coil unit connected to the reader, wherein a spacing between two of the first coil units is smaller than or equal to the original reading distance; the first coil units are configured to generate magnetic coupling with an adjacent first coil unit started from the first coil unit to extend the original reading distance to a first extended reading distance and to adjust a direction of the first extended reading distance,
wherein the direction of the first extended reading distance is adjusted to be along a hollow channel of the flexible supporting unit.

2. The electronic device of claim 1, wherein the first coil units have same sizes and are arranged along a straight line, the spacing is equal to the original reading distance; a number of the first coil units is a positive integer N, the first extended reading distance is N times the original reading distance, and the direction of the first extended reading distance is along the straight line.

3. The electronic device of claim 1, wherein the first coil units have same sizes and are arranged along a curve, and the direction of the first extended reading distance is along the curve.

4. The electronic device of claim 1, wherein the first coil units are arranged according to sizes of the first coil units, and the first coil unit is a minimum first coil unit in the first coil units.

5. The electronic device of claim 1, wherein the first coil units are arranged according to sizes of the first coil units, and the first coil unit is a maximum first coil unit in the first coil units.

6. The electronic device of claim 1, wherein each of the other first coil unit comprises a resonant capacitor.

7. The electronic device of claim 1, wherein the first coil units have different sizes and different shapes.

8. The electronic device of claim 1, wherein the first coil units have same sizes and same shapes.

9. The electronic device of claim 1, further comprising:
a plurality of second coil units,
wherein the reader is connected to a second coil unit of the second coil units to read the at least one wireless signal in the original reading distance, and other second coil units of the second coil units are separately arranged in an order started from the second coil unit, wherein a spacing between two of the second coil units is smaller than or equal to the original reading distance; the second coil units are configured to generate magnetic coupling with an adjacent second coil unit started from the second coil unit to extend the original reading distance to a second extended reading distance and to adjust a direction of the second extended reading distance.

10. A method of extending reading distance, comprising:
generating magnetic coupling in turn by a plurality of first coil units that are separately arranged, wherein a reader is connected to a first coil unit of the first coil units to read at least one wireless signal in an original reading distance, and other first coil units of the first coil units are separately arranged in an order started from the first coil unit;
extending the original reading distance to a first extended reading distance;
adjusting a direction of the first extended reading distance; and
adjusting, by a flexible supporting unit, the direction of the first extended reading distance to be along a hollow channel of the flexible supporting unit,
wherein the first coil units are arranged along a surface of the flexible supporting unit.

11. The method of claim 10, further comprising:
generating magnetic coupling in turn by a plurality of second coil units that are separately arranged, wherein the reader is connected to a second coil unit of the second coil units to read the at least one wireless signal in the original reading distance, and other second coil units of the second coil units are separately arranged in an order started from the second coil unit;
extending the original reading distance to a second extended reading distance; and
adjusting a direction of the second extended reading distance.

* * * * *